UNITED STATES PATENT OFFICE.

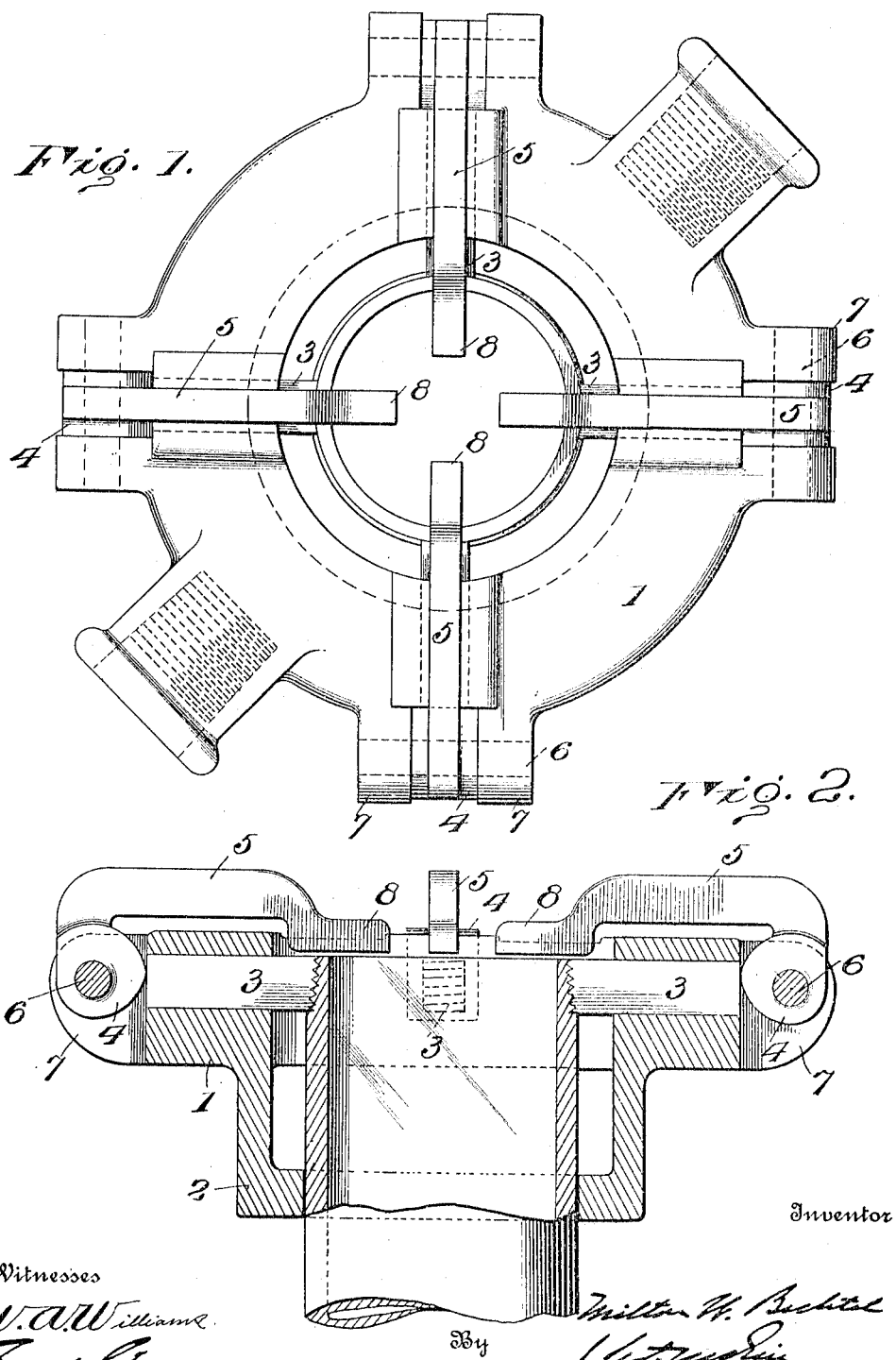

MILTON W. BECHTEL, OF WARREN, OHIO, ASSIGNOR TO THE BORDEN COMPANY, OF WARREN, OHIO, A CORPORATION OF OHIO.

PIPE-THREADING TOOL.

1,119,338.      Specification of Letters Patent.      Patented Dec. 1, 1914.

Application filed February 3, 1914. Serial No. 816,319.

*To all whom it may concern:*

Be it known that I, MILTON W. BECHTEL, of Warren, in the county of Trumbull and State of Ohio, have invented certain new and useful Improvements in Pipe-Threading Tools; and I do hereby declare the following to be a full, clear, and exact description of the invention, such as will enable others skilled in the art to which it appertains to make and use the same.

The object of this invention is to provide improved means whereby the chasers will be controlled in their recession by the pipe being threaded.

In the accompanying drawing, Figure 1 is an elevation. Fig. 2 is a vertical longitudinal sectional view.

Referring to the drawings, 1 designates the chaser-carrier which is shown as having a work-guide 2, but if desired the chaser-carrier may be employed in connection with known work-holders which are designed to be secured to the pipe and relative to which the chaser-carrier has both a rotary and longitudinal movement.

The chasers 3, which are capable of receding as the cutting operation progresses, are slidable in suitable guides or housings on the chaser-carrier. At their outer ends these chasers engage cams 4 which are shown as the eccentrically hinged outer ends of levers 5, the fulcrum pins 6 of which are supported by spaced-apart ears 7 of the chaser-carrier. The levers extend transversely of the axis of the tool and substantially parallel with the front face of the chaser-carrier. Their inner ends extend into the path of the pipe, being bent rearwardly and provided with flat bearings 8 which extend into the central opening of the chaser-carrier a sufficient distance to insure their being engaged by the pipe as soon as the chasers take hold of the latter.

As the cutting operation progresses the levers are forced outwardly by the direct action of the pipe on their inner ends. This results in the turning of the cams, and as the latter occurs the chasers are allowed to recede, the contour of the cams being such as to provide for a gradual recession.

The advantages of my invention will be readily appreciated by those skilled in the art.

I claim as my invention:

1. A pipe threading tool comprising a chaser-carrier, a series of chasers mounted therein, and levers for controlling the recession of the chasers, said levers being designed to be directly engaged and moved by the pipe being threaded.

2. A pipe threading tool comprising a chaser-carrier, a series of chasers mounted therein, and levers for controlling the recession of the chasers, said levers at their inner ends extending into the path of the pipe being threaded so as to be engaged thereby as the cutting operation progresses.

3. A pipe threading tool comprising a chaser-carrier, a series of chasers, cams with which said chasers engage, and means in the path of the pipe being threaded for rotating said cams to control the recession of the chasers.

4. A pipe threading tool comprising a chaser-carrier, a series of chasers, cams with which said chasers engage, and levers for controlling said cams, said levers being extended into the path of the pipe being threaded so as to be engaged thereby to control the recession of the chasers.

5. A pipe threading tool comprising a chaser-carrier, a series of chasers, and a series of levers fulcrumed on said chaser-carrier and having at their outer ends cams with which said chasers engage, said levers being extended transversely of the chaser-carrier and into the path of the pipe being threaded so as to be engaged thereby to control the recession of the chasers as the cutting operation progresses.

In testimony whereof, I have signed this specification in the presence of two subscribing witnesses.

MILTON W. BECHTEL.

Witnesses:
  I. B. TAYLOR,
  E. R. OTT.